United States Patent
Rendely et al.

(10) Patent No.: US 11,603,955 B2
(45) Date of Patent: Mar. 14, 2023

(54) STRUCTURAL CONNECTION BETWEEN IN-LINE PIPES AND TUBES

(71) Applicant: The Rendely Connection, Huntington Station, NY (US)

(72) Inventors: Wayne Rendely, Huntington Station, NY (US); Anthony Whitlow, Cibolo, TX (US)

(73) Assignee: The Rendely Connection, Huntington Station, NY (US)

( * ) Notice: Subject to any disclaimer, the term of this patent is extended or adjusted under 35 U.S.C. 154(b) by 0 days.

(21) Appl. No.: 17/474,742

(22) Filed: Sep. 14, 2021

(65) Prior Publication Data

US 2021/0404589 A1 Dec. 30, 2021

Related U.S. Application Data

(62) Division of application No. 16/295,820, filed on Mar. 7, 2019, now Pat. No. 11,125,373.

(60) Provisional application No. 62/639,705, filed on Mar. 7, 2018.

(51) Int. Cl.
| | |
|---|---|
| *F16L 41/00* | (2006.01) |
| *F16L 9/22* | (2006.01) |
| *F16L 41/08* | (2006.01) |
| *F16L 9/00* | (2006.01) |
| *F16L 25/12* | (2006.01) |

(52) U.S. Cl.
CPC ............ *F16L 41/001* (2013.01); *F16L 9/22* (2013.01); *F16L 41/082* (2013.01); *F16L 9/006* (2013.01); *F16L 25/12* (2013.01)

(58) Field of Classification Search
CPC ......... F16L 41/001; F16L 41/082; F16L 9/22; F16L 9/006; F16L 13/02; F16L 13/0218; F16L 13/0227; F16L 13/0236; F16L 13/06; F16L 25/12; F16L 47/14; F16L 58/187; F16L 57/00; F16L 23/00; F16L 23/003; F16L 23/18; F16L 21/065; F16L 55/18; F16L 23/024; F16L 25/065; F16L 27/08; F16L 27/12; F16L 23/006; F16L 23/0283; F16L 23/032; F16L 23/20
USPC ............ 285/24, 288.1, 288.2, 288.7, 288.11, 285/294.1, 368, 388, 412, 15
See application file for complete search history.

(56) References Cited

U.S. PATENT DOCUMENTS

| | | | |
|---|---|---|---|
| 3,047,016 A | | 7/1962 | Andresen |
| 3,507,506 A | * | 4/1970 | Tillman ................. F16L 23/20 |
| 4,864,707 A | | 9/1989 | Kamenster |
| 5,690,368 A | * | 11/1997 | Johnson ................ F16L 23/024 |

(Continued)

FOREIGN PATENT DOCUMENTS

| | | | | |
|---|---|---|---|---|
| DE | 102016105168 A1 | * | 9/2017 | ............ F16L 23/032 |
| KR | 2009008490 U | * | 8/2009 | ............ F16L 23/032 |

(Continued)

*Primary Examiner* — Zachary T Dragicevich
*Assistant Examiner* — William S. Choi
(74) *Attorney, Agent, or Firm* — The Farrell Law Firm, P.C.

(57) ABSTRACT

A single piece structural connector is provided that includes a single machined aluminum piece having first and second circular ends including a plurality of bolt holes and a center hole. The connector also includes an alignment dowel positioned on the center hole. The alignment dowel is configured to tightly fit into a center hole of a pipe plate.

3 Claims, 7 Drawing Sheets

(56) References Cited

U.S. PATENT DOCUMENTS

| | | | |
|---|---|---|---|
| 5,988,699 A * | 11/1999 | Quandt | F16L 23/032 |
| 7,195,289 B2 | 3/2007 | Matt | |
| 2007/0007768 A1* | 1/2007 | Ho | F16L 23/0283 |
| 2008/0080080 A1* | 4/2008 | Armstrong | F16L 23/006 |
| 2014/0239633 A1 | 8/2014 | Swingley | |
| 2015/0323183 A1 | 11/2015 | Butcher | |
| 2016/0040810 A1 | 2/2016 | Winkler | |

FOREIGN PATENT DOCUMENTS

| | | | | |
|---|---|---|---|---|
| KR | 2011040049 A * | 4/2011 | | F16L 23/032 |
| KR | 2043302 B1 * | 12/2019 | | F16L 23/026 |

* cited by examiner

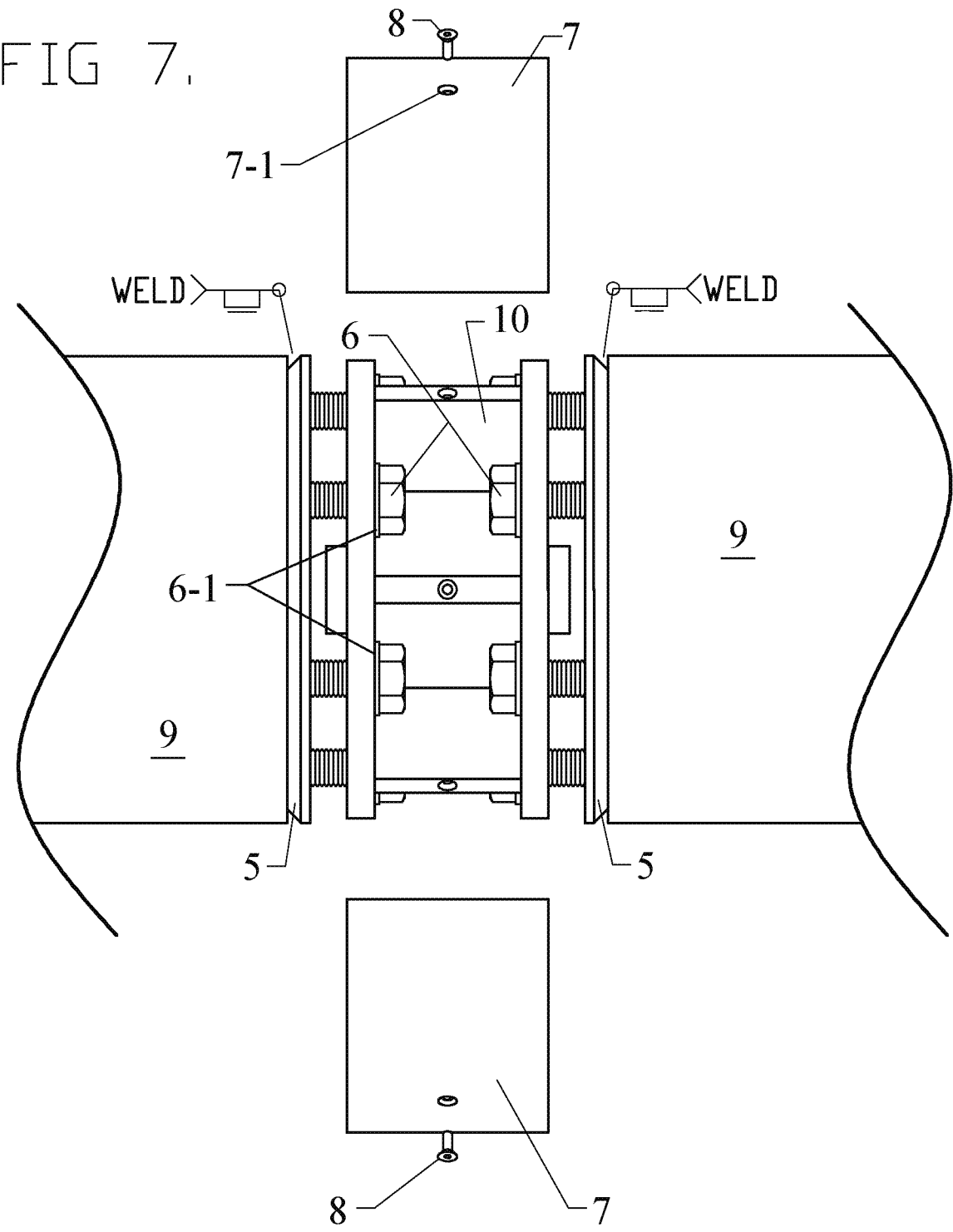

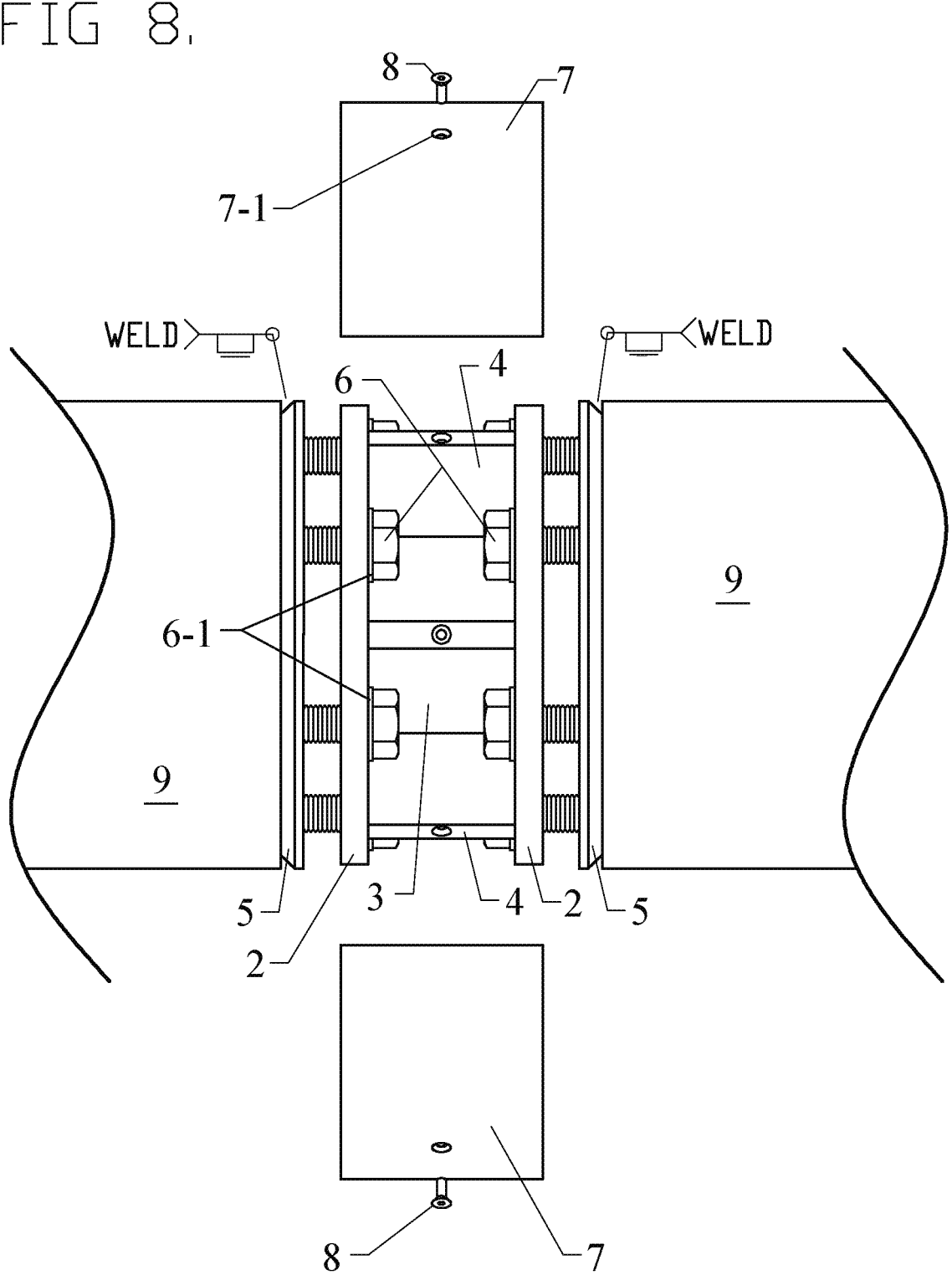

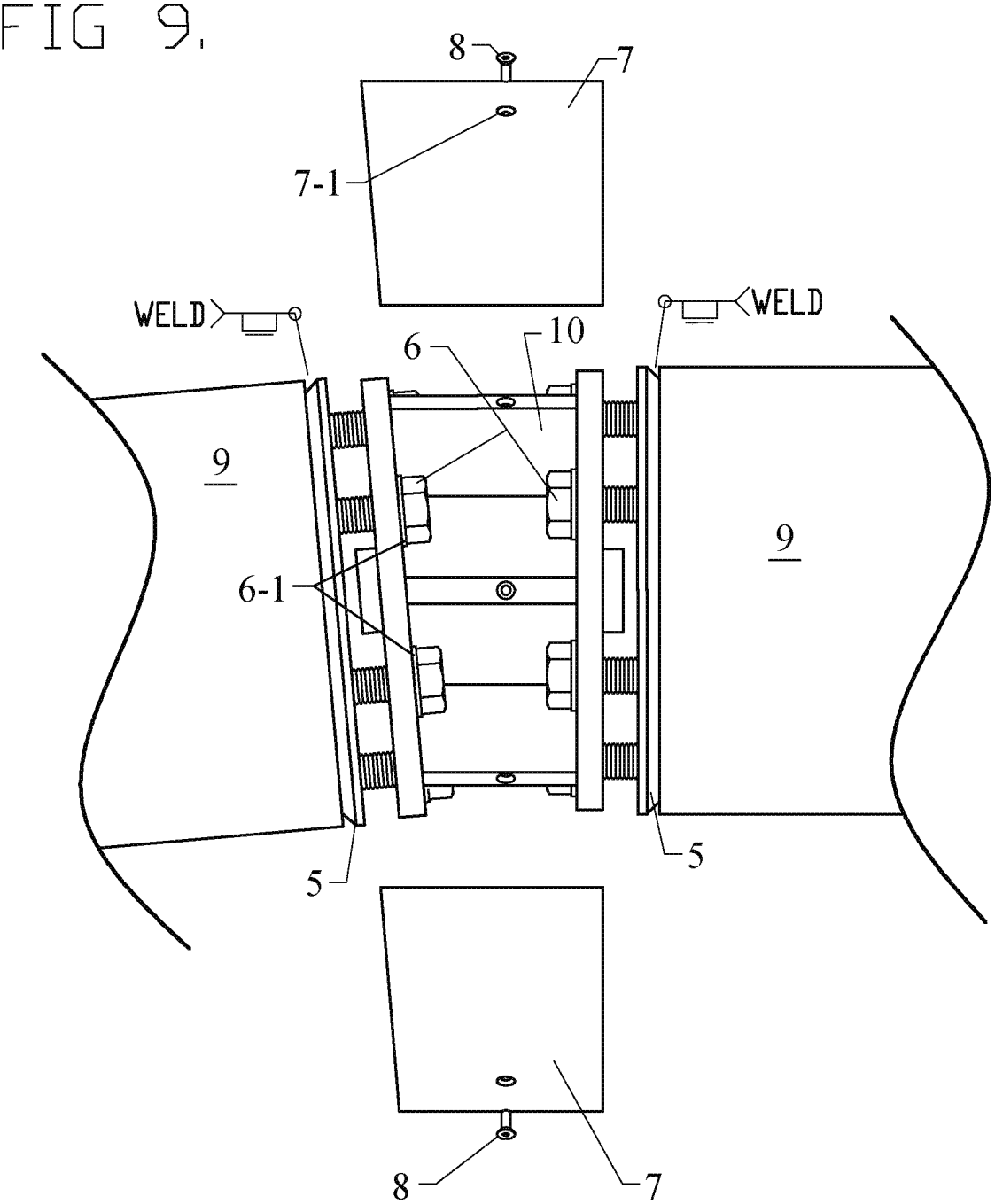

STRUCTURAL CONNECTION BETWEEN IN-LINE PIPES AND TUBES

PRIORITY

This application is a Divisional Application of U.S. application Ser. No. 16/295,820, filed on Mar. 7, 2019, now U.S. Pat. No. 11,125,373, issued on Sep. 21, 2021, which claims priority under 35 U.S.C. § 119 to U.S. Provisional Application Ser. No. 62/639,705, which was filed in the U.S. Patent and Trademark Office on Mar. 7, 2018, the contents of which are incorporated herein by reference.

BACKGROUND OF THE INVENTION

1. Field of the Invention

The present invention relates generally to structural connectors, and more particularly, to structurally connecting pipes and tubes within their diametric or length and width dimensions while concurrently providing a passageway for items through the interior of said pipes and tubes.

2. Description of the Related Art

Known in-line structural connections that enable a passageway or pass through for items through pipes and tubes use flange plates that are larger in diameter or length and width than the pipes or tubes.

Other connections known in the art that have dimensions within the outer dimensions of the pipe or tube are cast without pass through holes or have numerous large welds, both of which are very expensive and add unnecessary cost. In addition, such connections are overly lengthy in size, which is not aesthetically pleasing and also requires these connections to have longer cover plates.

Accordingly, there is a need in the art for a secure and more aesthetically pleasing structural connection that reduces cost yet provides a pass through for items in the interior of the connection.

SUMMARY OF THE INVENTION

The present invention has been made to address at least the above-mentioned problems and/or disadvantages and to provide at least the advantages described below.

Accordingly, an aspect of the present invention is to provide a structural connection that reduces the number of welds or even eliminates altogether, while providing a passageway for items such as cables and pipes through the connection.

Another aspect of the present invention is to provide a structural connection that eliminates the need for nuts by threading directly into a pipe end plate.

Another aspect of the present invention is to provide a structural connection that is fabricated by a single-piece construction, while providing a passageway for items through the connection.

In accordance with an aspect of the present invention, a single piece structural connector includes a single machined aluminum piece having first and second circular ends, each of the first and second circular ends including a plurality of bolt holes and a center hole, and an alignment dowel positioned on the center hole, the alignment dowel being configured to tightly fit into a center hole of a pipe plate.

BRIEF DESCRIPTION OF THE DRAWINGS

The above and other aspects, features, and advantages of the present invention will be more apparent from the following detailed description taken in conjunction with the accompanying drawings, in which:

FIG. 7 illustrates the structural connector positioned between in-line pipes, according to a second embodiment of the present invention;

FIG. 8 illustrates the structural connector positioned between in-line pipes, according to a third embodiment of the present invention; and FIG. 9 illustrates the structural connector positioned between in-line pipes, according to a fourth embodiment of the present invention.

DETAILED DESCRIPTION

Figure 1:
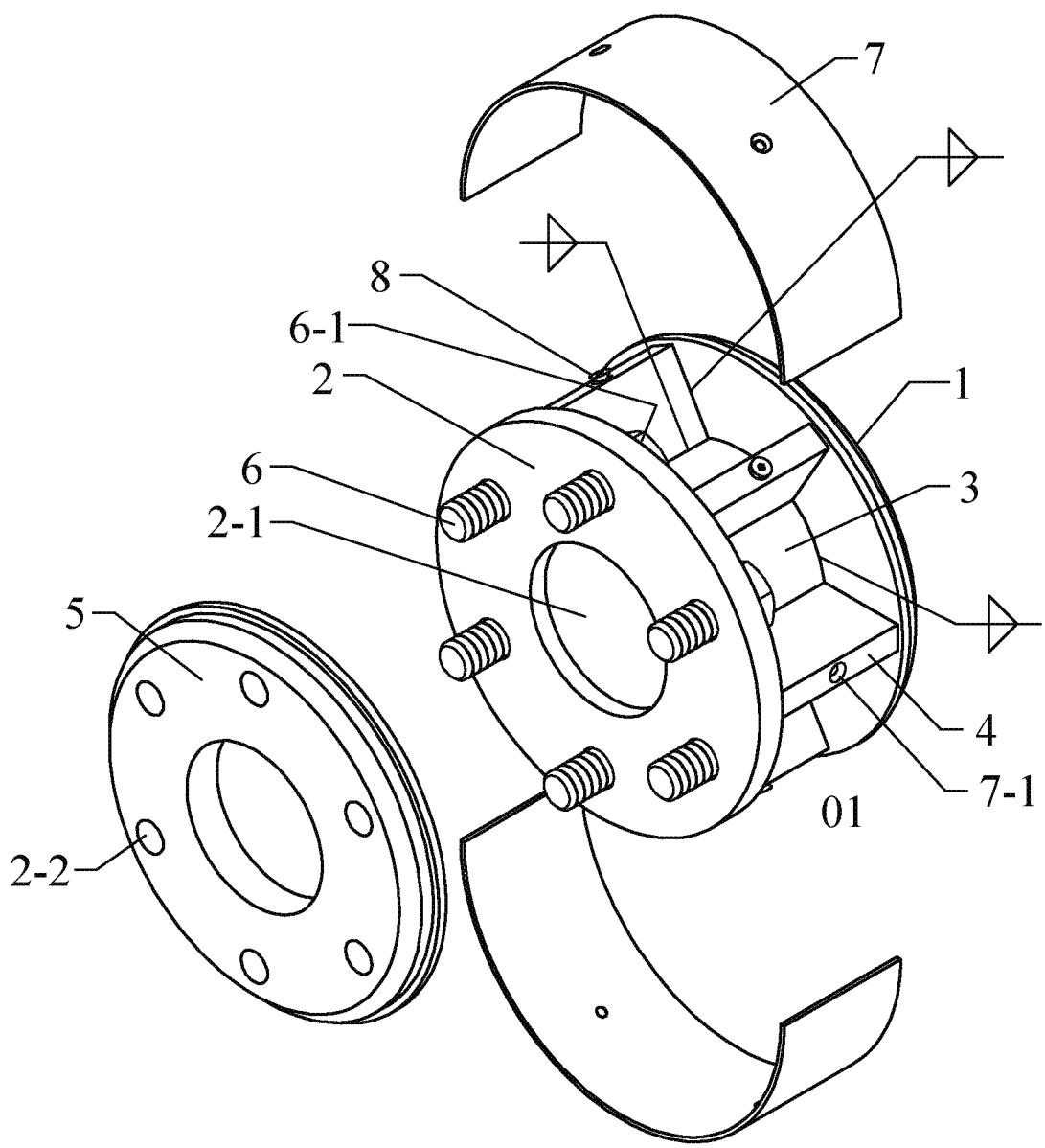
FIG. 1 illustrates a structural connector according to the present invention.

Embodiments of the present invention will be described herein below with reference to the accompanying drawings. However, the embodiments of the present invention are not limited to the specific embodiments and should be construed as including all modifications, changes, equivalent devices and methods, and/or alternative embodiments of the present invention. Descriptions of well-known functions and/or configurations will be omitted for the sake of clarity and conciseness.

The terms and words used in the following description and claims are not limited to their dictionary meanings, but are merely used to enable a clear and consistent understanding of the present invention. Accordingly, it should be apparent to those skilled in the art that the following description of embodiments of the present invention is provided for illustrative purposes only and not for the purpose of limiting the present invention as defined by the appended claims and their equivalents.

Singular terms "a," "an," and "the" include plural references unless the context clearly dictates otherwise. For example, reference to "a component surface" includes reference to one or more of such surfaces.

The embodiments are described herein by way of illustration only and should not be construed in any way to limit the scope of the present invention. Those skilled in the art will understand that the principles of the present invention may be implemented in any suitably arranged structural connection.

As used herein, the term "substantially" indicates that the recited characteristic, parameter, or value need not be achieved exactly, but that variations such as tolerances, measurement errors, measurement accuracy limitations and other factors known to those of ordinary skill in the art, may occur in amounts that do not preclude the effect the characteristic was intended to provide.

The expressions "have," "may have," "include," and "may include" as used herein indicate the presence of corresponding features, such as numerical values, functions, operations, or parts, and do not preclude the presence of additional features. The expressions "A or B," "at least one of A or/and B," or "one or more of A or/and B" as used herein include all possible combinations of items enumerated with them. For example, "A or B," "at least one of A and B," or "at least one of A or B" indicate (1) including at least one A, (2) including at least one B, or (3) including both at least one A and at least one B.

Terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. A first element may be referred to as a second element without departing from the scope the present invention, and similarly, a second element may be referred to as a first element.

When a first element is "operatively or communicatively coupled with/to" or "connected to" another element, such as a second element, the first element may be directly coupled with/to the second element, and there may be an intervening element, such as a third element, between the first and second elements. To the contrary, when the first element is "directly coupled with/to" or "directly connected to" the second element, there is no intervening third element between the first and second elements.

All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present invention.

As stated above, the present invention aims to structurally connect pipes and tubes within their dimensions while concurrently providing an interior pass through for items such as cables and conduit pipes.

To cure the above-noted problems in the prior art, the structural connector of the present invention can be used with a machined plate with tapped holes at the ends of the pipe or tube. The tapped holes are configured to accept structural bolts that enable the two pipe or tube members to be structurally connected. The structural connection disclosed in the present application can be a welded steel or aluminum plate assembly, or can be machined from extruded aluminum in a single-piece construction.

In addition, the structural connector of the present invention uses approximately half the number of welded gusset plates and flange plates required in the prior art, and eliminates the use of nuts by threading directly into the pipe end plate(s). Prior art cast connections do not have a hole for pass through, and prior art welded connections use numerous large welds and twice the number of plates and washers than in the present invention, while also requiring the use of nuts.

In contrast, the structural connector of the present invention uses less material and requires less fabrication time than with prior art structural connectors, and can be made of machined extruded aluminum that eliminates welding and welding inspection, thereby improving quality control. The machined aluminum can be fabricated with an angle change to accommodate a change of direction in the pipes or to facilitate a mis-alignment discovered in the field.

The structural connector of the present invention eliminates the use of cast metal, which requires creation of expensive molds that are time-consuming for custom configurations. The structural connector of the present invention uses half the number of gusset plates and bolt plates as the "Diablo Connections" known in the prior art.

FIG. 1 illustrates a structural connector 01 according to the present invention.

Referring to FIG. 1, the structural connector 01 includes a machined pipe plate 1, a machined bolt plate 2, a short length center pipe 3, a plurality of gusset plate fins 4, a machined pipe plate 5, bolts 6 with accompanying washers 6-1, cover plates 7, and cover screws 8.

The machined pipe plate 1 is fabricated with an edge having a beveled portion, and a large, circular hole 2-1 passing through the center of the machined pipe plate 1. Each of the gusset plate fins 4 is welded to a bottom side of the machined pipe plate 1 and is evenly spaced around a diameter of the machined pipe plate 1.

The machined bolt plate 2 has a diameter of slightly less than the machined pipe plate 1 and is fabricated with the large, circular hole 2-1 through the center and a plurality of threaded holes 2-2 evenly spaced around and outside of the circular hole 2-1. The short length center pipe 3 extends through the center of the connector 01 between the circular holes 2-1 of the machined pipe plate 1 and of the machined bolt plate 2, thereby connecting the machined pipe plate 1 to the machined bolt plate 2.

The machined pipe plate 5 is fabricated with an edge having a beveled portion, and a large, circular hole 2-1 as in the machined pipe plate 1, and is tapped with threaded holes 2-2 to accommodate the bolts 6 and accompanying washers 6-1. The bolts 6 may be hexagonal-head bolts, for example.

The cover plates 7 are fabricated of sheet metal, are generally semi-circular in shape and are positioned around the diameter of the structural connector 01 between the machined pipe plate 1 and the machined pipe plate 5. The cover plates 7 include a plurality of threaded holes 7-1 and are connected to each other by virtue of cover screws 8 that extend through the plurality of threaded, chamfered holes 7-1 and into a plurality of gusset plate fins 4 positioned between the machined pipe plate 1 and the machined bolt plate 2 connected to the machined pipe plate 5. Each of the gusset plate fins 4 includes threaded, tapped holes of an identical size (about ¼ inch diameter) as the threaded holes 7-1 of the cover plates 7 to accommodate the cover screws 8, which may be flat-headed sheet metal screws, for example.

Each of the machined pipe plate 1, bolt plate 2, center pipe 3 and gusset plate fins 4 are welded together as illustrated in FIG. 1.

Figure 2:
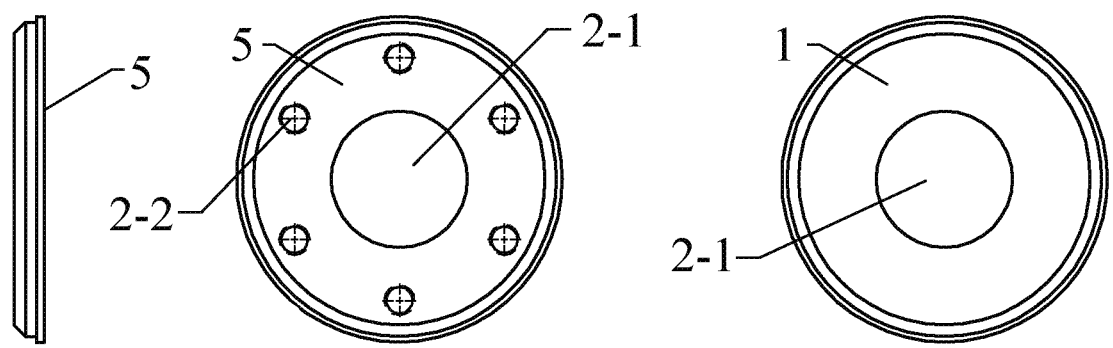
FIG. 2 illustrates top and side views of a pipe plate of the structural connector, according to the present invention.

FIG. 2 illustrates top and side views of the machined pipe plate 5 of the structural connector 01, according to the present invention.

Referring to FIG. 2, the machined pipe plate 5 includes a large, circular hole 2-1 and a plurality of threaded holes 2-2 to accommodate the plurality of bolts 6 and washers 6-1 under the heads of the bolts 6, as referenced in FIG. 1. In this manner, first and second pipes 9 (see FIG. 3) on either end of the structural connector 01 are securely attached to opposite ends of the structural connector 01, to resist against tension, compression, shear, torsion, and moments in all directions while enabling cables, pipes and other items to pass through the large, center hole 2-1 within the interior of the pipes, out of view from the exterior of the connector.

Figure 3:
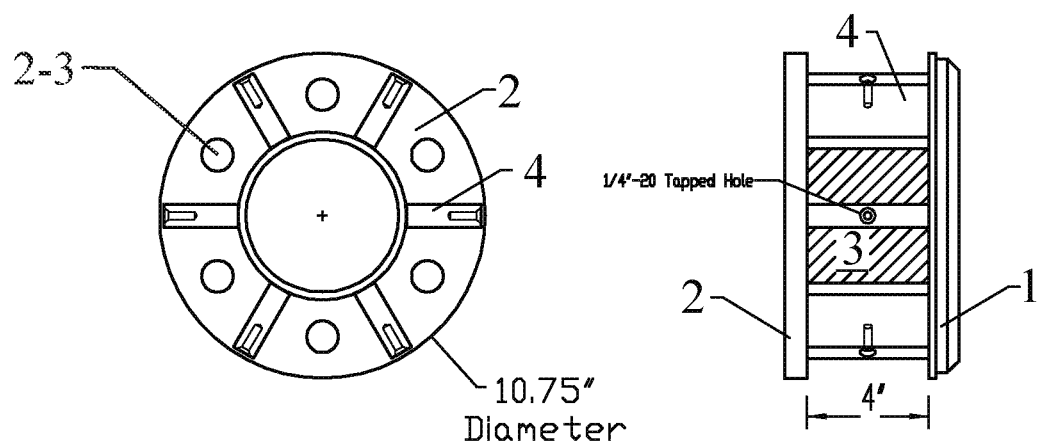
FIG. 3 illustrates top and side views of a bolt plate of the structural connector, according to the present invention.

FIG. 3 illustrates top and side views of a bolt plate of the structural connector, according to the present invention.

Figure 5:
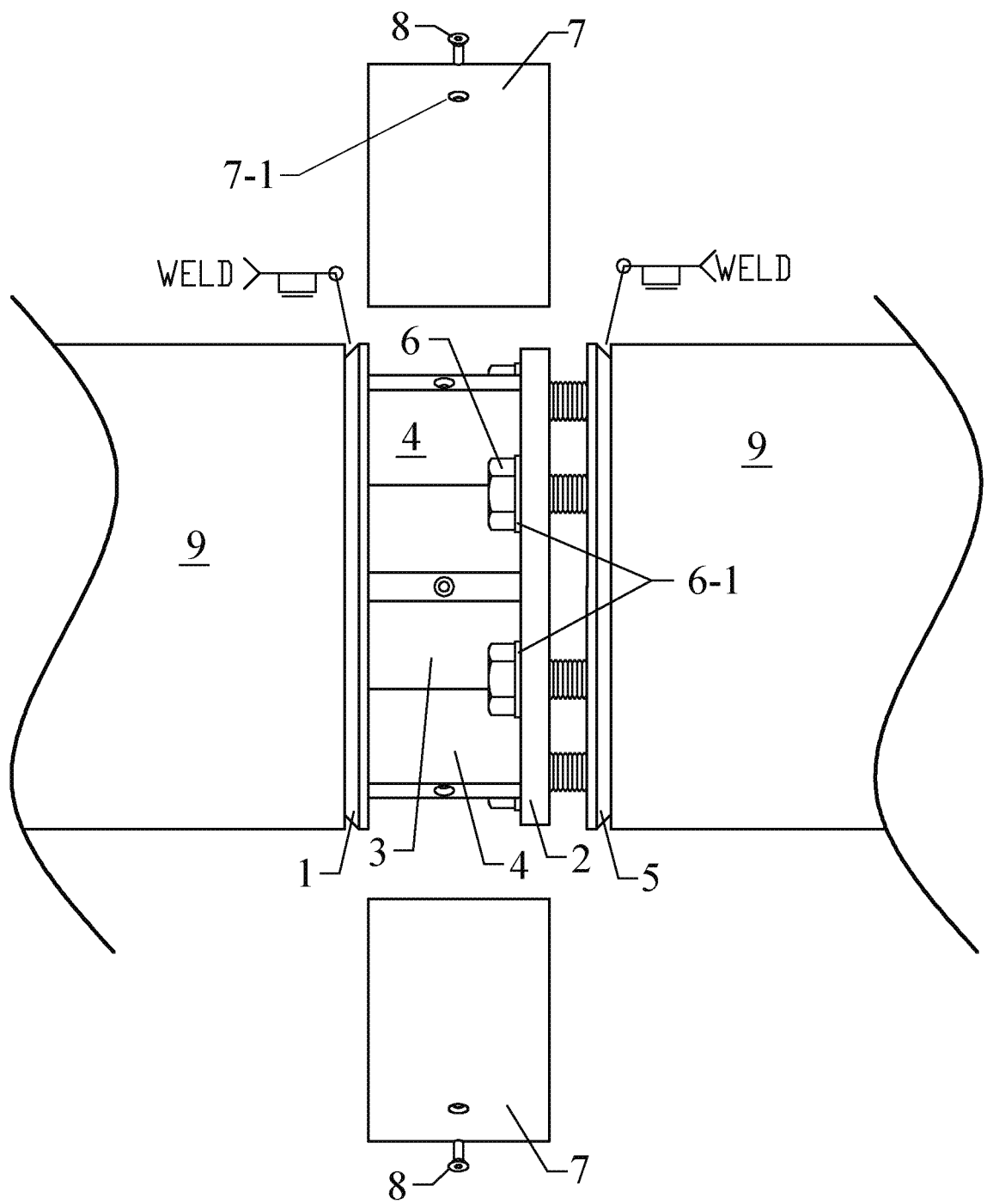
FIG. 5 illustrates the structural connector positioned between in-line pipes, according to a first embodiment of the present invention.

Referring to FIG. 3, two in-line pipes 9 (or tubes), shown in FIG. 5, are connected to each other by the structural connector 01. Specifically, one end of a first pipe 9 is welded, such as in a machine shop, to the machined pipe plate 1, and an end of a second pipe 9 is welded, in the machine shop, to the machined pipe plate 5. Subsequently, the bolt plate 2 of the structural connector 01 is bolted to the pipe plate 5, on-site (i.e., in the field), to complete the connection. The distance between the pipe plate 1 and the bolt plate 2 is about 4 inches, and the diameter of the pipe plate 1 and the bolt plate 2 is about 10.75 inches.

As shown in FIG. 3, the bolt plate 2 includes a plurality of non-threaded holes 2-3 into which the bolts 6 can be inserted, the holes 2-3 being approximately $1/16^{th}$ of an inch larger in diameter than the diameter of the bolts 6. In this manner, the bolts 6 connect the bolt plate 2 and the machined pipe plate 5 together, as the bolts 6 penetrate through the bolt holes 2-3 into the tapped, threaded holes 2-2 of the machined pipe plate 5, as will be described in reference to FIG. 5.

Figure 4:
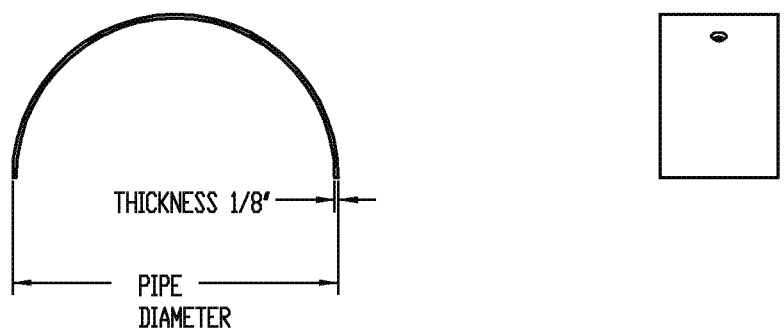
FIG. 4 illustrates a connection cover for the structural connector, according to the present invention.

FIG. 4 illustrates a connection cover for the structural connector, according to the present invention.

Referring to FIG. 4, a thickness and diameter generally contemplated for the connection cover (or cover plate) 7 are shown. That is, a thickness of about $1/8^{th}$ of an inch and diameters of about 4.5 inches to about 12.75 inches and a width of about 4-6 inches are general dimensions for the connection cover 7.

FIG. 5 illustrates the structural connector positioned between in-line pipes, according to a first embodiment of the present invention.

Referring to FIG. 5, the machined pipe plate 1 of the structural connector 01 is welded to a first pipe 9 on one side, and is welded to gusset plate fins 4 on the opposing side in the manner described in reference to FIG. 1. Then, the bolt plate 2, to which is attached the center pipe 3 and gusset plate fins 4 are welded as also described in reference to FIG. 1, is bolted to the machined pipe plate 5 that has been welded onto a second pipe 9. These welds are typically made at a machine shop, for example, and the bolting together performed on-site join the first and second pipes 9. For aesthetic purposes, the welds are ground smooth in the shop and the cover plate is installed on-site, thereby hiding the connection from view.

As illustrated in FIG. 5, cover plates 7 are connected to each other by cover screws 8 that extend through the plurality of threaded holes 7-1 on the cover plates 7 and into a plurality of gusset plate fins 4 positioned between the machined pipe plate 1 and the machined bolt plate 2 connected to the machined pipe plate 5.

Figure 6:
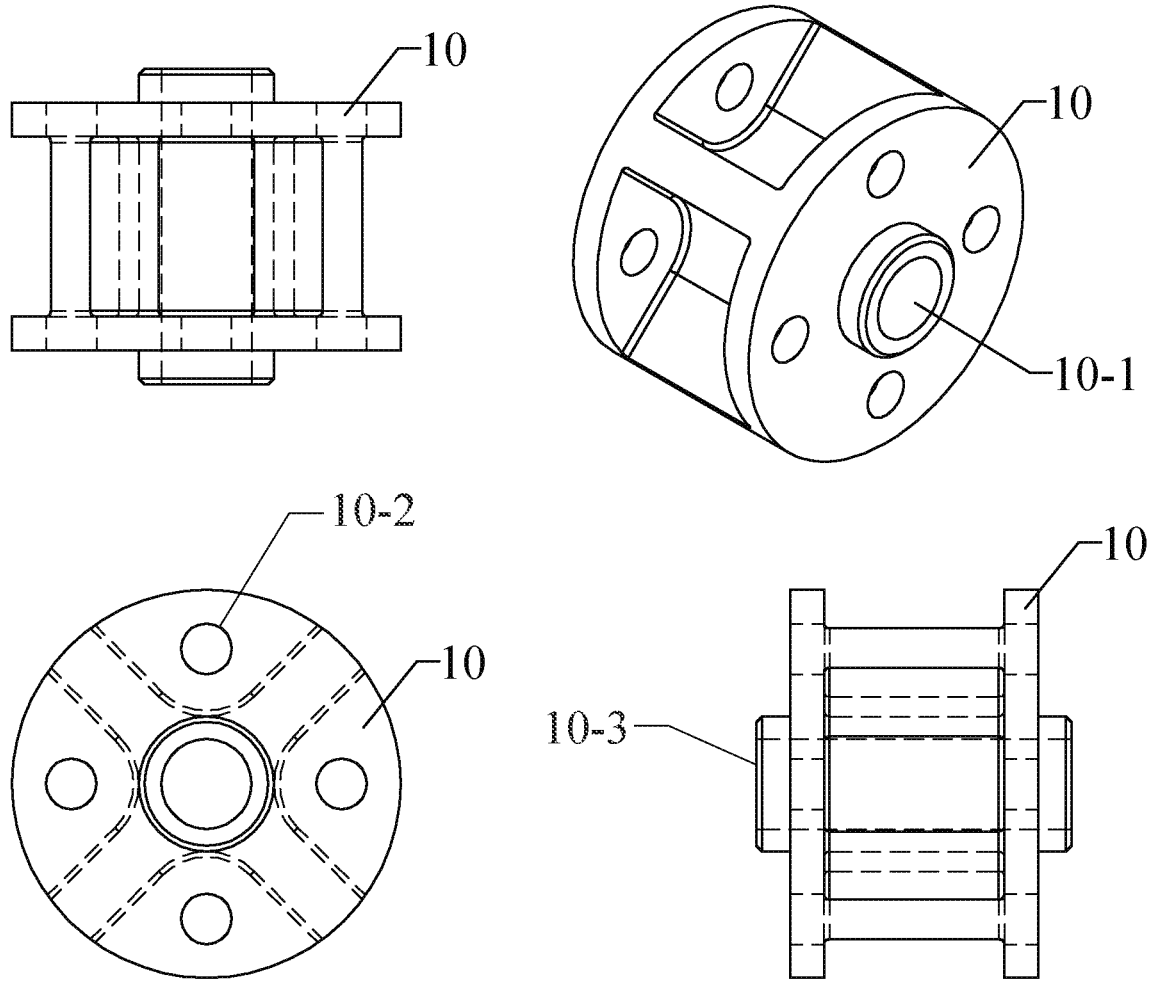
FIG. 6 illustrates top, side and diagonal views of a machined extruded aluminum piece for the structural connector, according to the present invention.

FIG. 6 illustrates top, side and diagonal views of a machined extruded aluminum piece for the structural connector, according to the present invention.

Referring to FIG. 6, four views of a single piece, machined extruded aluminum configuration of the structural connector 10 are illustrated. As indicated in the bottom-right illustration, ends of a center hole 10-1 through the connection are extended from the body of the structural connection. That is, in FIG. 6, the bolt plate 2, cover tube 3 and gusset plate fins 4 are replaced with a single machined aluminum item 10, which is bolted to the machined and threaded plates 5 on respective ends using 4 bolts, in the manner of the bolting in FIG. 5 of the bolt plate 2, cover tube 3 and gusset plate fins 4 to the machined and threaded plate 5. This bolting is performed on two machined and threaded plates 5, i.e., on either side of the machined aluminum item 10 through bolt holes 10-2, as will be described in detail in FIG. 7. In turn, the machined and threaded plates 5 are welded to the ends of the first and second pipes 9, in the manner described above for the machined and threaded plate 5 illustrated in FIG. 5. Alignment dowels 10-3 protrude from the ends of both sides of the machined aluminum item 10, and tightly fit into corresponding center holes of the pipe end plate of the machined aluminum item 10.

FIG. 7 illustrates the structural connector positioned between in-line pipes, according to a second embodiment of the present invention.

Referring to FIG. 7, the machined aluminum item 10, described in reference to FIG. 6, is bolted to two machined pipe plates 5 on opposite sides of the machined aluminum item 10 through bolt holes 10-2 provided on the machined aluminum item 10. In turn, each of the machined pipe plates 5 is respectively welded onto first and second pipes 9 in the manner described in reference to FIG. 5 for a single connection to the machined pipe plate 5. As further illustrated, the bolts 6 and washers 6-1 are used to bolt the machined aluminum item 10 to the machined pipe plate 5 of each pipe 9.

FIG. 8 illustrates the structural connector positioned between in-line pipes, according to a third embodiment of the present invention.

Referring to FIG. 8, the bolt plate 2, center pipe 3 and gusset plate fins 4 replace the machined aluminum item 10 in the second embodiment described in reference to FIG. 7. Accordingly, the bolt plate 2, center pipe 3 and gusset plate fins 4, described in reference to FIG. 5, are bolted to two machined pipe plates 5 on opposite sides of the connection configured by the bolt plate 2, center pipe 3 and gusset plate fins 4.

FIG. 9 illustrates the structural connector positioned between in-line pipes, according to a fourth embodiment of the present invention.

Referring to FIG. 9, the embodiment of FIG. 7 is modified such that a portion of one side of the machined aluminum item 10 is offset (i.e., bent) by an angle of about 5 degrees. That is, the machined aluminum item 10 is bolted to two machined pipe plates 5 on opposite sides of the machined aluminum item 10 through bolt holes 10-2 provided on the machined aluminum item 10, and each of the machined pipe plates 5 is respectively welded onto first and second pipes 9, achieving the structural connection. The bolts 6 and washers 6-1 are used to bolt the machined aluminum item 10 to the machined pipe plate 5 of each pipe 9.

As illustrated in FIG. 9, the upper portion of the left side of the machined aluminum item 10 is offset by about 5 degrees, such that the first pipe 9 welded to the machined pipe plate 5 on the left side of the machined aluminum item 10 is off-line with respect to the second pipe 9 on the right side of the machined aluminum item 10, by about 5 degrees. Such a configuration as in the embodiment of FIG. 9 illustrates how the structural connector of the present invention may be modified to facilitate connection of pipes or conduits that are not in a straight line, as needed. Other angle offsets for a portion of the machined aluminum item 10 may also be utilized, as needed.

Each embodiment described above enables a secure attachment of the two pipes that resist tension, compression, shear, torsion, and moments in all directions while allowing items such as cables and pipes to pass through the center hole within the interior of the connector, in a manner that is not visible from the exterior of the structural connection.

The connection dimensions stay within the outer dimensions of the pipes and can be covered to completely hide the connection from view for aesthetic purposes, such as by using the cover plates 7. These cover plates 7 are securely fastened to the connector 01 using flat head cover screws 8, for example.

As to fabrication, a steel or aluminum fabrication shop may machine, drill and tap the various metal parts and then weld the plate and above-discussed pipe items together. The present invention may be used with 4 bolts and 4 gussets rather than 6 bolts and 6 gussets as illustrated, or a differing number of such bolts and gussets may be contemplated in a manner that will securely fasten together the components of the structural connection.

The structural connector of the present invention could be used in a configuration having electrical conduits or wires, or having water or sprinkler pipes running inside the structural pipe in an unseen manner. Thus, no unsightly exposed wires of conduits are visible, and the pass through items are also protected from elements outside the structural pipes. Different items may also pass through the structural connector, as needed.

As described above, the present invention eliminates the need for nuts by threading directly into the pipe end plate. The present invention also requires less material and fabrication time, due to a more simplistic construction, eliminates the need for numerous large welds, and conveniently provides for a large center hole for cables and pipes to pass through the connection inside the pipes.

Embodiments of the present invention disclosed in the specification and the drawings are only particular examples disclosed in order to easily describe the technical matters of the present invention and assist with comprehension of the present invention, and do not limit the scope of the present invention. Therefore, in addition to the embodiments disclosed herein, the scope of the embodiments of the present invention should be construed to include all modifications or modified forms drawn based on the technical aspects of the embodiments of the present invention.

While the present invention has been described with reference to various embodiments, various changes may be made without departing from the spirit and the scope of the present invention, which is defined, not by the detailed description and embodiments, but by the appended claims and their equivalents.

What is claimed is:

1. A single piece structural connector, comprising:
a single machined aluminum piece having first and second circular ends, each of the first and second circular ends including a plurality of bolt holes and a center hole; and
an alignment dowel positioned on the center hole, the alignment dowel being configured to fit into a center hole of a pipe plate,
wherein each of the first and second circular ends is configured to be bolted to first and second circular pipe plates on respective ends of the single piece structural connector using a plurality of bolts of a number equal to a number of the plurality of bolt holes, and
wherein a first pipe portion is connected to a second pipe portion when a beveled portion of the first circular pipe plate is welded to the first pipe portion and a beveled portion of the second circular pipe plate is welded to the second pipe portion.

2. The single piece structural connector of claim 1, wherein a portion of one side of the single machined aluminum piece is offset by a predetermined angle.

3. The single piece structural connector of claim 2, wherein the offset portion of the single machined aluminum piece causes the first pipe portion to be welded to the first pipe plate in a manner off-line with respect to the second pipe portion.

* * * * *